US011979195B2

(12) United States Patent
Isaacson

(10) Patent No.: US 11,979,195 B2
(45) Date of Patent: May 7, 2024

(54) SYSTEM AND METHOD FOR SCHEDULING AND DISTRIBUTING QUANTUM ENTANGLED PARTICLES

(71) Applicant: Thomas M. Isaacson, Huntingtown, MD (US)

(72) Inventor: Thomas M. Isaacson, Huntingtown, MD (US)

(*) Notice: Subject to any disclaimer, the term of this patent is extended or adjusted under 35 U.S.C. 154(b) by 274 days.

(21) Appl. No.: 17/481,370

(22) Filed: Sep. 22, 2021

(65) Prior Publication Data
US 2022/0094442 A1 Mar. 24, 2022

Related U.S. Application Data

(60) Provisional application No. 63/081,542, filed on Sep. 22, 2020.

(51) Int. Cl.
H04B 10/70 (2013.01)
G06N 10/00 (2022.01)

(52) U.S. Cl.
CPC ............. H04B 10/70 (2013.01); G06N 10/00 (2019.01)

(58) Field of Classification Search
CPC ...................................... H04B 10/70
See application file for complete search history.

(56) References Cited

U.S. PATENT DOCUMENTS

| | | | |
|---|---|---|---|
| 9,509,507 B1 * | 11/2016 | Hunt ..................... | H04L 9/0855 |
| 2020/0396067 A1 * | 12/2020 | Barker .................. | H04L 9/0894 |
| 2022/0393865 A1 * | 12/2022 | Williams .............. | H04B 10/70 |
| 2022/0393866 A1 * | 12/2022 | Williams .............. | H04L 9/0855 |

* cited by examiner

Primary Examiner — Nathan M Cors

(57) ABSTRACT

Disclosed is a method that includes receiving, at a scheduling server, a request for a first particle of a pair of quantum entangled particles and a second particle of the pair of quantum entangled particles, evaluating the request based on one or more parameters to yield a schedule and communicating instructions from the scheduling server to an entangled particle production system to deliver, according to the schedule, the first particle to a first node and to deliver the second particle to a second node according to the request. In this manner, respective particles of a quantum entangled pair can be delivered to the appropriate nodes for use in a communication.

20 Claims, 5 Drawing Sheets

SYSTEM AND METHOD FOR SCHEDULING AND DISTRIBUTING QUANTUM ENTANGLED PARTICLES

PRIORITY INFORMATION

The present application claims the benefit of U.S. Provisional Application No. 63/081,542, filed Sep. 22, 2020, the contents of which are incorporated herein by reference.

RELATED APPLICATION

The present application is related to U.S. patent application Ser. No. 16/693,477, filed Nov. 25, 2019, now U.S. Pat. No. 10,848,460, issued Nov. 24, 2020, which is a continuation-in-part of U.S. patent application Ser. No. 16/298,649, filed Mar. 11, 2019, now U.S. Pat. No. 10,491,414, issued on Nov. 26, 2019, the contents of which are incorporated herein by reference.

TECHNICAL FIELD

The disclosure relates to the distribution of quantum entangled particles and more specifically to a scheduler that schedules the use of quantum entangled particles and a production system that produces and distributes quantum entangled particles to the proper destination devices for secure communications.

BACKGROUND

It is recently been proven that technology exists that enables quantum entangled particles to be separated by over 1000 km by virtue of being transmitted from a satellite to separated ground stations on the earth. In an experiment led by Professor Jian-Wei Pan of Hefei University in China, a satellite orbiting 480 kilometers above the earth produced quantum entangled photons. A laser beam is used to transmit one particle of the pair of entangled particles from the satellite to a ground station. One laser beam transmits one particle and another laser beam transmits another particle. The laser beams carry quantum information. There are several challenges that exist even given this new breakthrough.

First, the transmission of the quantum information occurs over the air interface because transmitting quantum information via fiber-optic cables does not maintain the entanglement between the two entangled particles for long distance. Previous capabilities were 1/10 of what was achieved through use of the satellite and the laser transmission. Assume a satellite transmitted a first entangled particle to a first receiving station in New York. A second receiving station receives the second entangled particle in Chicago. For a secure communication to exist between these two stations, there should be some knowledge of the location of the stations, and some valuable communication to exchange using the entangled particles. The complexity of this process can make it very difficult for an average person to enjoy the benefits of immediate and secure communications. A specialized receiving system would be needed for both the first receiving station and the second receiving station.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
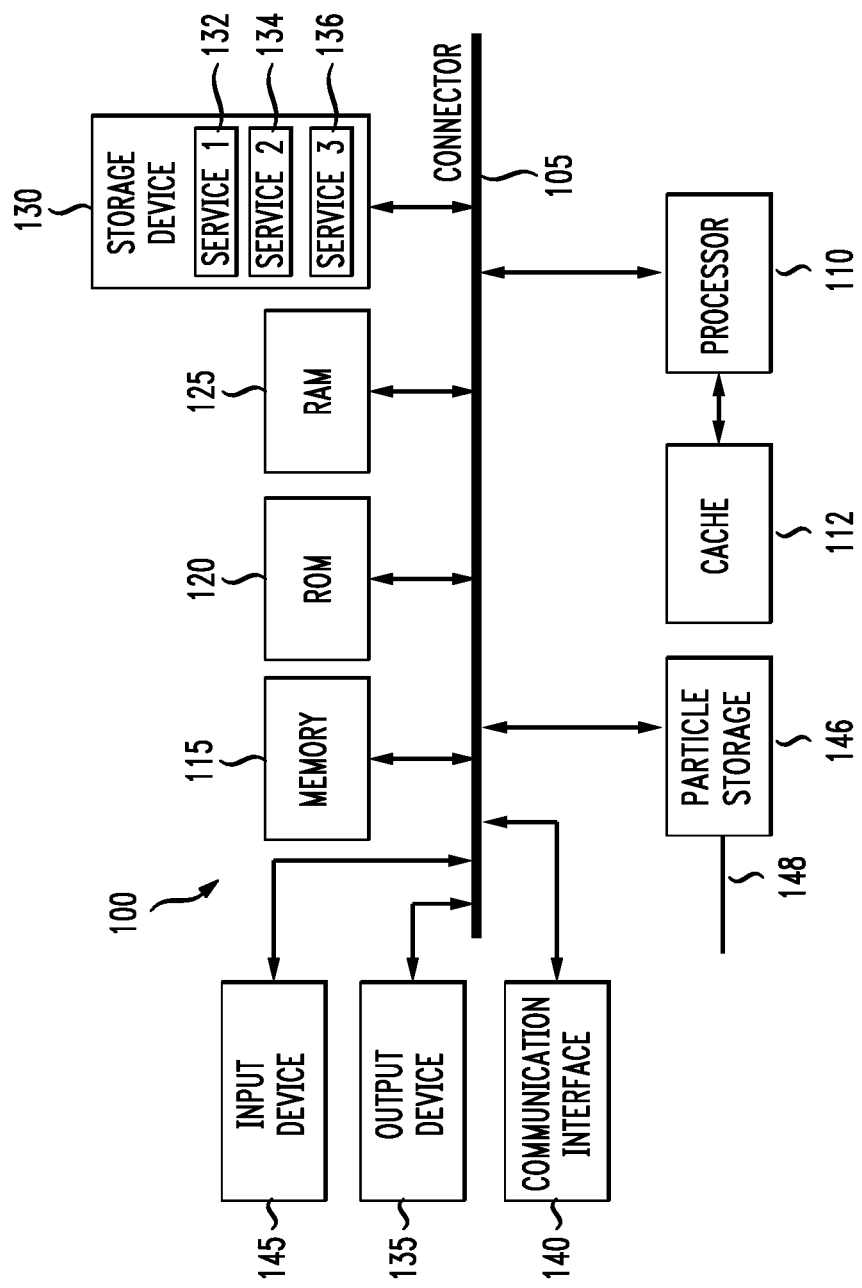
FIG. 1A illustrates an example system configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

What is needed in the art is a mechanism for the average user to be able to take advantage of quantum entanglement-based communications. Note that in some cases, information such as qbits might be transmitted via quantum communications such as via a quantum mesh network that is used to establish the positions of separated quantum entangled particles. In another aspect, having one or more quantum particles at each node of a communication between one node and another may not be used for communicating data but for securely ensuring that the data that is communicated classically is not hacked. For example, if a hacking entity tries to view the communication or measure the quantum particle, the wave function will collapse and the system will know that it has been measured and thus hacked. There are a number of different uses of the pairs of quantum entangled particles and this disclosure focuses on a quantum particle scheduling and production system to enable such communications.

An example method is recited from the standpoint of a scheduling server that schedules the production and/or delivery of quantum entangled particles. The method includes receiving, at a scheduling server, a request for a first particle of a pair of quantum entangled particles and a second particle of the pair of quantum entangled particles, evaluating the request based on one or more parameters to yield a schedule and communicating instructions from the scheduling server to an entangled particle production system to deliver, according to the schedule, the first particle to a first node and to deliver the second particle to a second node according to the request. The production system will generate the first particle and the second particle as a pair of quantum entangled particles that share the same waveform. The request can include an identification of the first node and the second node. The instructions can include one of a schedule and a first route for delivering the first particle to the first node and a second route for delivering the second particle to the second node. The route can begin with a satellite production system that transmits the quantum particles through laser to ground receiving stations for delivery via fiber-optic cables to the first node and the second node. Other routes such as through planes, drones, to other satellites and so forth can be used to route the respective quantum entangled particles to their destination nodes.

The entangled particle production system can include a satellite, a device on an airplane, and/or a ground-based production system. The entangled particle production system can generate and/or deliver the pair of quantum entangled particles via a laser to at least one ground station. A satellite could deliver a quantum entangled particle via a laser to another satellite which can then transmit the particle down to a ground station or other flying vehicle. The ground station or flying vehicle can be configured with a receiving component that can receive and store or forward the entangled particle. The entangled particle production system can deliver the first particle to a first ground station and can deliver the second particle to a second ground station. Typically, the first ground station then delivers the first particle to the first node and the second ground station also delivers the second particle to the second node. This process of course can be asynchronous and any individual node or device in the distribution system can store a quantum particle of a pair of quantum particles and preparation for delivering to a node.

The schedule can include a requirement to deliver the first particle to the first node and to deliver the second particle to the second node prior to an established time for a communication between the first node and the second node. The schedule can be established based on one or more of a priority associated with the first node or the second node, a priority associated with users of the pair of quantum entangled particles, a priority associated with a communication to be established using the pair of quantum entangled particles, a type of quantum particle (atom, photon, electron, etc.), a characteristic of the first node and the second node, a first delivery route between the entangled particle production system and the first node and a second delivery route between the entangled particle production system and the second node, a cost, weather conditions, a load on the entangled particle production system, load-balancing associated with an entangled particle delivery system, a volume of requests for quantum entangled particles, a load on the entangled particle production system associated with delivering produced quantum entangled particles, a type of communication associated with the request, a preferred schedule versus an acceptable schedule for delivering the quantum entangled particles, a time of day of the request, a timing associated with a required delivery of the quantum entangled particles, whether asynchronous delivery of the quantum entangled particles is required, an airplane or other flying vehicle schedule associated with planes/drones/vehicles having quantum entangled receiving devices, a viability time associated with the quantum entangled particles, and a distance between the first node and the second node. A volume of how many particles need to be at each node also can be taken into account as well is the likely number of quantum entangled particles that will arrive safely at the various nodes without being destroyed.

The schedule can include an identification of a first path through a quantum particle delivery system for the first particle to travel to the first node or a second path through the quantum particle delivery system for the second particle to travel to the second node. Once the respective particles are delivered to the respective nodes, they can be used for communicating data, if possible, or can be used to encrypt or secure a communication between two parties such that the communication cannot be hacked. As noted above, qbits might also be transmitted via teleportation from one particle to the next.

Detailed Description

The present disclosure addresses the issues raised above. The disclosure provides a system, method and computer-readable storage device embodiments. First a general example system shall be disclosed in FIG. 1A which can provide some basic hardware components making up a server, node or other computer system. FIG. 1A illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different performance characteristics. The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may essentially be a completely self-contained computing system, containing multiple cores or processors, a bus (connector), memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

FIG. 1A includes a particle storage device 146. This represents any known or future developed device for storing quantum entangled particles that can be used on either end of a transmission. For example, the device 146 can be an optical cavity that can be used to trap atoms or photons. The storage 146 can include all the necessary capability as would be known to one of skill in the art to store, detect, and/or evaluate a characteristic of an entangled particle. Thus, the device 146 can represent the necessary components to receive, via a fiber-optic network 148 the entangled particles and can communicate via bus 105 or other means with other components of the computing device.

With quantum entanglement, a first particle is entangled with a second particle. In one aspect of this means that they both share a characteristic such as a spin direction. When a detector detects or measures the spin of the first particle, assume that the first particle is in an up direction. The result is that immediately, the spin of the second particle collapses (i.e., the wavefunction of the pair of particles) into the down direction. The spin that is chosen is random and cannot be predicted in advance. Thus, if Alice has a first entangled particle on her device and Bob has the second entangled particle on his device, when Alice detects the spin of the first particle, it does not pass any information to Bob. Bob does not even know when Alice detected the spin of the first particle. If the spin of the first particle at noon, as detected by Alice is determined to be in the up direction, then Bob, when he inspects the second particle at 12:01, will simply identify that the spin of the second particle is down. One aspect of this disclosure recognizes that direct communication is not necessarily available at this time through quantum entanglement. However, in another aspect, it does assume that further development will identify how information can be transmitted such as through qbits. For example, the Bell state forms part of the setup for quantum teleportation in which quantum entanglement allows multiple states to be acted on simultaneously, unless classical bits that are either a 0 or a 1. Quantum teleportation is a technique for transferring quantum information from a sender at one location (a node with a quantum entangled particle) to a receiver some distance away (having the other entangled quantum particle). While teleportation is commonly portrayed in science fiction as a means to transfer physical objects from one location to the next, quantum teleportation only transfers quantum information. The sender may not know the location of the recipient, and does not know which particular quantum state will be transferred. In either event, distribution of entangled particles is necessary.

Part of the distribution system disclosed herein could also include the concept of entanglement swapping which is known in the art as an algorithm for swapping Bell pairs of entangled particles. In some cases, such an approach could be included in as part of the path or route for quantum particle delivery.

Figure 1B:
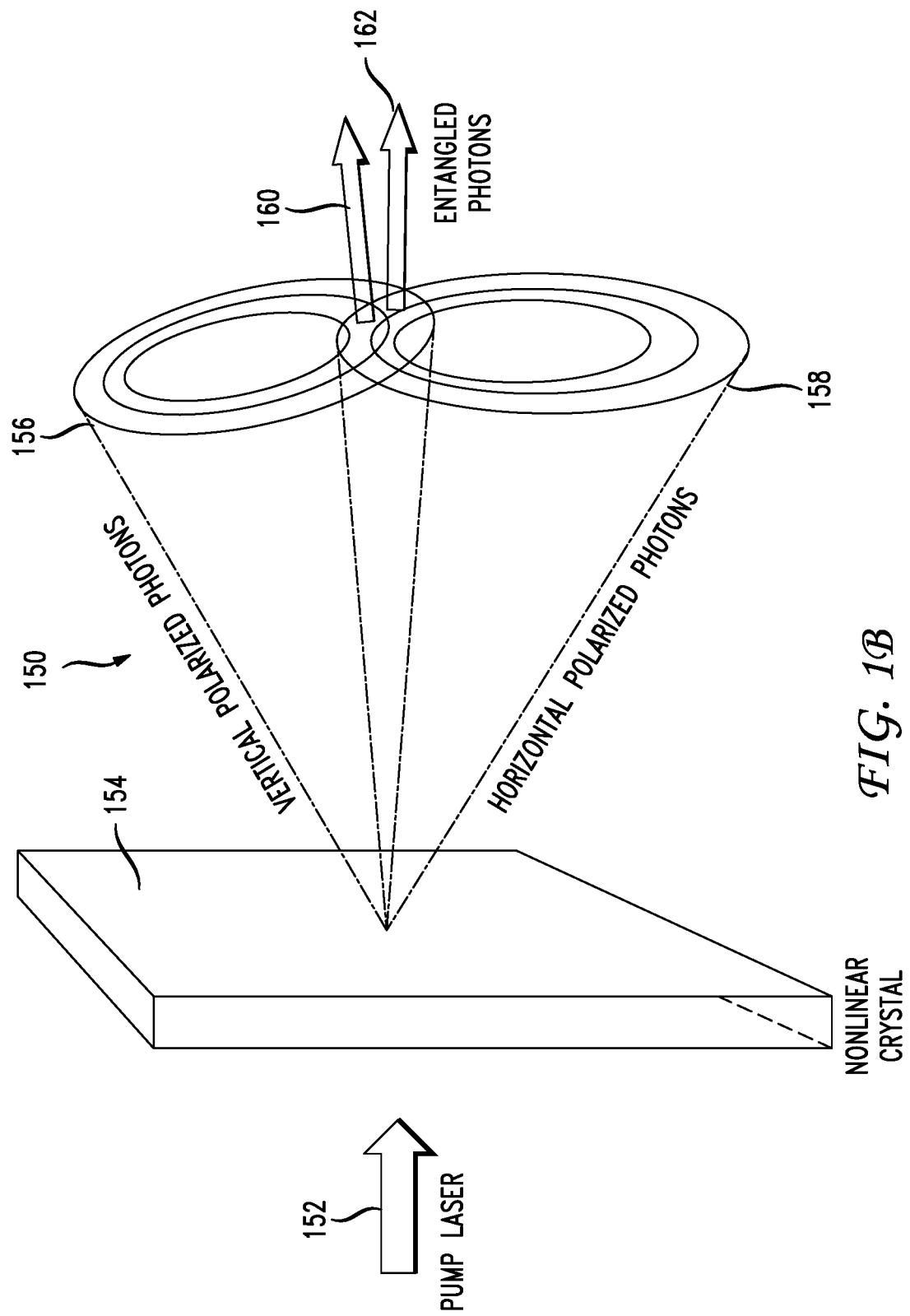
FIG. 1B illustrates an entangled particle production system.

FIG. 1B illustrates a basic system 150 for generating entangled particles. A pump laser 152 generates a laser beam that is transmitted to a crystal 154. The beam interacts with the crystal 154 that creates vertically polarized photons 156 and horizontally polarized photons 158. As part of these two sets of photons, entangled photons 160 and 162 are generated. These entangled photons can then be communicated to receiving devices for use in a quantum encrypted communication. Any system can be used to generate entangled particles. Different types of particles can also be generated such as atoms, photons, electrons and so forth. The system 150 can be deployed also in any necessary location for the production of entangled particles. The system 150 can be positioned within a satellite, within an airplane, a drone, within a ground station or location, or any other location. A production system for providing entangled quantum particles can also utilize a number of different systems 150 for generating entangled particles as shall be described herein.

Known challenges exist for communicating information between the pair of separated entangled quantum particles. Besides communicating information between quantum particles, utilizing separated entangled particles for encryption purposes is possible.

For example, quantum key distribution (QKD) uses quantum mechanics to guarantee secure communication. It enables two parties to produce a shared random secret key known only to them, which can then be used to encrypt and decrypt messages. It is often incorrectly called quantum cryptography, as it is the most well-known example of the group of quantum cryptographic tasks.

An important and unique property of quantum key distribution is the ability of the two communicating users to detect the presence of any third party trying to gain knowledge of the key. This results from a fundamental aspect of quantum mechanics: the process of measuring a quantum system in general disturbs the system. A third party trying to eavesdrop on the key must in some way measure it, thus introducing detectable anomalies. By using quantum superpositions or quantum entanglement and transmitting information in quantum states, a communication system can be implemented that detects eavesdropping. If the level of eavesdropping is below a certain threshold, a key can be produced that is guaranteed to be secure (i.e. the eavesdropper has no information about it), otherwise no secure key is possible and communication is aborted.

The security of encryption that uses quantum key distribution relies on the foundations of quantum mechanics, in contrast to traditional public key cryptography, which relies on the computational difficulty of certain mathematical functions, and cannot provide any indication of eavesdropping at any point in the communication process, or any mathematical proof as to the actual complexity of reversing the one-way functions used. QKD has provable security based on information theory, and forward secrecy Quantum key distribution is only used to produce and distribute a key, not to transmit any message data. This key can then be used with any chosen encryption algorithm to encrypt (and decrypt) a message, which can then be transmitted over a standard communication channel. The algorithm most commonly associated with QKD is the one-time pad, as it is provably secure when used with a secret, random key. In real-world situations, it is often also used with encryption using symmetric key algorithms like the Advanced Encryption Standard algorithm.

One use of quantum entanglement with respect to sending messages is the issue of security and secrecy. Regular non-quantum encryption works in a variety of ways but generally involves scrambling a message that can only be unscrambled using a secret key. The trick is to make sure that whomever a person is trying to hide a communication from doesn't get their hands on the secret key. Cracking the private key via a modern cryptography system would generally require figuring out the factors of a number that is the product of two insanely huge prime numbers. The numbers are typically chosen to be so large that with the giving processing power of computers, it would take longer than the lifetime of the universe for an algorithm to factor their product.

With quantum cryptography, the issues with respect to traditional encryption are avoided. In this case, the key is to encrypt a series of photons that get passed between two parties trying to share secret information. The Heisenberg uncertainty principle dictates that an adversary can't look at these photons without changing or destroying them. There are other ways of exploiting weaknesses with quantum cryptography. For example, a hacker could build a detector with a strong pulse and be rendered unable to see the secret keeping photons. In another aspect, photons are generating using a laser tuned to such a low intensity that produces a single photon at a time. There is a certain probability associated with this process. The laser will make a photon and encode it with your secret information and then encode a second photon at the same time with the same information. The hacker could simply steal the second photon and to gain access to the data while the user is unaware. However, the approach disclosed herein can address some of these issues by utilizing entangled photons which are created in such a way that they will always behave the same way no matter the distance between them. Measuring the properties of one member of the entangled pair and the system instantly knows the characteristics of the other member. Parties can encode a key into a pair of entangled photons and then each take one. The enemy that intercepted or stole one of the photons would be unable to replace it because the new photon would not be entangled. When the two original parties measure their photons and see that the properties do not lineup, they would know that they have been hacked. One benefit of using quantum cryptography is that it is been shown that they are two orders of magnitude faster than conventional techniques and can be used to encrypt smart grid information. Accordingly, the benefits of the particle entanglement distribution system disclosed herein are clear.

One example protocol that could be used is described next. Given the entangled particle distribution system disclosed herein, one protocol that could be used is the E91 protocol by Artur Ekert. The Ekert scheme uses entangled pairs of photons. These can be created by any source as disclosed herein. The distribution system disclosed herein provides one particle of the pair for each party to a communication. The scheme relies on two properties of entanglement. First, the entangled states are perfectly correlated in the sense that if Alice (the sender) and Bob (the recipient) both measure whether their particles have vertical or horizontal polarizations, they always get the same answer with 100% probability. The same is true if they both measure any other pair of complementary (orthogonal) polarizations. This necessitates that the two distant parties have exact directionality synchronization. However, the particular results are completely random; it is impossible for Alice to predict if she (and thus Bob) will get vertical polarization or horizontal polarization. Second, any attempt at eavesdropping by Eve (the eavesdropper) destroys these correlations in a way that Alice and Bob can detect.

The E91 protocol involves a private measurement protocol before detecting the presence of Eve. The measurement stage involves Alice measuring each photon she receives using some basis from the set while Bob chooses from Z0, $Z_{pi/8}$, $Z_{-pi/8}$ where is the $\{|\uparrow], |\rightarrow]\}$ basis rotated by theta. They keep their series of basis choices private until measurements are completed. Two groups of photons are made: the first consists of photons measured using the same basis by Alice and Bob while the second contains all other photons. To detect eavesdropping, they can compute the test statistic using the correlation coefficients between Alice's bases and Bob's similar to that shown in the Bell test experiments. Maximally entangled photons would result in If this were not the case, then Alice and Bob can conclude Eve has introduced local realism to the system, violating Bell's Theorem. If the protocol is successful, the first group can be used to generate keys since those photons are completely anti-aligned between Alice and Bob.

The principles disclosed herein do not necessarily depend on whether quantum particles are used for communicating information or whether they are used for secure classical communication and encryption purposes.

Figure 2:
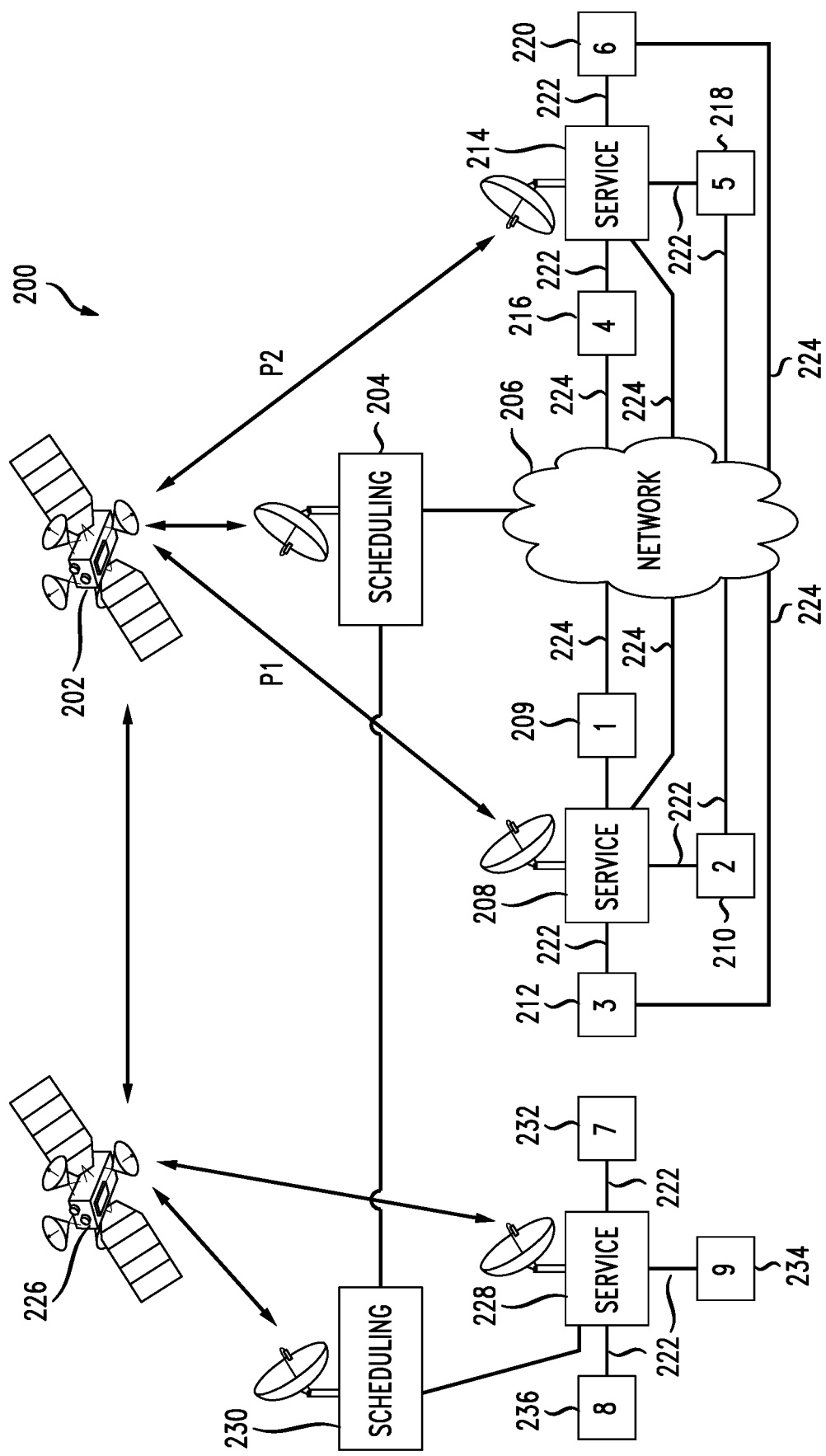
FIG. 2 illustrates an example entangled particle distribution network.

Having introduced the basic computing components which can be applicable to embodiments associated with this disclosure, the disclosure now turns to FIG. 2 which illustrates an example network environment.

The following solution provides a mechanism for the average user to be able to utilize quantum entanglement for communications generally or for a secure communication. The overall network 200 requires several components. A satellite 202 can utilize a laser and a crystal 150, using known mechanisms, to generate entangled particles 160, 162. To illustrate the approach, the disclosure will step through an example of a sender of information, Alice, who is at a computer 212 in New York. She desires to send data to a recipient Bob in Tokyo who is at a computer 220. Assume that each computer 212, 220 includes proper particle storage components 140 and is connected to a proper fiber-optic network 142, such that it can receive and store quantum entangled particles.

The satellite 202 transmits a first entangled particle 160 to a first receiving station 208 in New York. Because fiberoptics can be used to communicate and entangled particle at least a certain distance (usually less than 100 km), the receiving station 208 in New York can communicate the entangled particle 160, via fiberoptics 222, within a certain distance from the receiving station 208, say 50 km. Station 208 communicates via fiberoptics 222 to computing devices, 212, 210, 209.

Note that in one aspect, any quantum entangled particle producing device can be used and it is not a requirement that the particles be created via a satellite. Generally, any producing device can be used and the system or network can then be utilized to transfer the quantum entangled particles to their destination. The disclosure herein primarily focuses on the requesting and scheduling aspect of this process. As noted above, the particles can be delivered directly or indirectly through the use of Bell's quantum state processes.

Quantum networks 200 form an important element of quantum computing and quantum cryptography systems. Quantum networks 200 allow for the transportation of quantum information between physically separate quantum systems. In distributed quantum computing, network nodes within the network can process information by serving as quantum logic gates. The optical quantum network 200 uses a combination of fiber optic links 222 or free-space links that each play a role transmitting quantum states in the form of photons across large distances. Optical cavities can be used to trap single atoms and can serve as storage and processing nodes in these networks.

Assume that the satellite 202 transmits the second entangled particle 162 to the second receiving station 214 in Tokyo, which also includes a fiber-optic network 222 to individual computing devices 216, 218, 220 within a 50 km distance from the second receiving station. Alice's computing device 212 is within 50 km of the first receiving station 208 and has a fiber-optic connection 222 to the first receiving station 208. The computing device also has the capability and structure for receiving the first entangled particle. Ted also has his computing device that has the capability and structure for receiving the second entangled particle via a fiber-optic link to the second receiving station.

Several basic components of the network 200 will be discussed next. The physical layer for distributing entangled particles is as follows. Over long distances, the primary method of operating quantum networks is to use optical networks and photon-based qubits. Optical networks 222 have the advantage of being able to re-use existing optical fiber. Optical networks 222 using existing telecommunication fiber can be implemented using hardware similar to existing telecommunication equipment. At the sender, a single photon source can be created by heavily attenuating a standard telecommunication laser such that the mean number of photons per pulse is less than 1. For receiving, an avalanche photodetector can be used. Various methods of phase or polarization control can be used such as interferometers and beam splitters. In the case of entanglement based protocols, entangled photons can be generated through spontaneous parametric down-conversion. In both cases, the telecom fiber can be multiplexed to send non-quantum timing and control signals.

Between the satellite 202 and receiving stations 208, 214, is a free space network. Free space quantum networks operate similar to fiber optic networks but rely on line-of-sight between the communicating parties instead of using a fiber optic connection. Free space networks can typically support higher transmission rates than fiber optic networks and do not have to account for polarization scrambling caused by optical fiber. Because higher elevation stations are in a thinner atmosphere than lower elevation stations, stations 208, 214 can be positioned on towers, mountains, planes, balloons, drones, or any structure that is fixed or movable for receiving entanglement particles. The producer 202 of the particles is shown to be a satellite but could also be any device on a plane, any flying device, a drone, etc. Again, as noted above, the producer of the particles also can be any station or node and does not have to be configured on a satellite.

Cavity-QED networks can be used as well. Telecommunication lasers and parametric down-conversion combined with photodetectors can be used for quantum key distribution. However, for distributed quantum entangled systems, it is important to be able to store and retransmit quantum information without disrupting the underlying states. Cavity quantum electrodynamics (Cavity QED) is one possible method of doing this. In Cavity QED, photonic quantum states can be transferred to and from atomic quantum states stored in single atoms contained in optical cavities. This allows for the transfer of quantum states between single atoms using optical fiber in addition to the creation of remote entanglement between distant atoms.

Alice's device 212 and Bob's device 220 are also connected 224 to the Internet 206 via traditional protocols. With this basic structure in place, the following procedure could occur to enable quantum entanglement communication between Alice and Bob. Alice submits a request for a communication with Bob via an interface or quantum entanglements service 204. The request could identify Bob as the recipient of the communication or the other parties of the communication, and some data that might identify the type of communication or how much communication is desired. For example, if Alice simply wants to send Bob a short text message, then a small number of entangled participles might only be needed to secure the message.

One aspect of the solution disclosed herein is an intelligent scheduling agent 204 that receives requests for entangled quantum particles and facilitates a schedule of delivery of the proper pairs of particles of the proper locations. There are many aspects of a quantum entangled particle delivery system as is shown in FIG. 2. For example, due to weather conditions, the satellite delivery of quantum entangled particles might be delayed. The position of the satellite 202 is moving and windows of time in which particles can be delivered to receiving stations, 202, 214 might be short. A scheduling agent 204 can take all of the various pieces of information into account in order to make scheduling decisions. The types of data that would be received and analyzed by the scheduling service 204 can include any one or more of the following. Further, depending on one or more factors, a type of quantum particle might need to be produced. Some types may travel with less degradation than others. Some type of particles might be good for different distances or type of networks. Some might be more robust or easier to produce. These various factors can be included in the process of receiving a request for particles and scheduling the production and delivery of the particles.

The scheduling agent 204 can receive and evaluate all of the requests for quantum entangled particles. Various request stores can be distributed throughout the network. Any device 209, 210, 212, 216, 220, 218, 232, 234, 236 can request particles for secure delivery. The requests would be submitted, preferably through a graphical user interface that can communicate with the agents 204 via an API or other standard protocol. The request will likely include a basic set of information. The request would include data such as one or more of an identification of the capabilities of a first device to the communication and capabilities of the second device to the communication. The information about the respective devices can be utilized to ensure that the devices have the proper equipment 146 for being able to receive entangled particles and perform the necessary functionality in order to utilize the particles for secure communication. Where are different equipment 146 might be deployed, which is designed for a particular type of particle, the scheduling agents 204 can ensure that there is a proper match between the equipment 146 at both ends of the communication as well as the production environments 202, such that there is a match in the types of particle use, the protocols that would be used, and so forth. The scheduling agent 204 could establish a communication with one device to the communication 202 as well as the other device 220 in the communication to ensure that they are operational.

Having confirmed that the equipment is in place to be able to utilize the quantum entangled particles, the scheduling agent 204 can receive data regarding the quantum particle production system 202. The production system is labeled as feature 202 in FIG. 2 but it can represent any combination of free space and/or fiber-optic systems. The scheduling agent 204 will receive information about the production capabilities, weather patterns, motion, and so forth of a satellite 202, such that it can coordinate instructions provided to the satellite in order to generate the quantum entangled particles and have them delivered to the appropriate receiving stations, 208, 214. The scheduling agent 204 can then communicate with the receiving stations 208, 214 to deliver the proper quantity of entangled particles to the two communication devices. Where the producing device is not a satellite, it's location and type of particles that it can produce can be utilized as part of the process of production and delivery.

Aspects of this delivery could include a satellite 202 delivering a first set of particles to a first receiving station 204 and holding in a storage component. The other part of the paired entangled particles, as the satellite moves into a new position on another side of the world, can be then transmitted to a second receiving station 214. In other words, the delivery of the particles does not have to be simultaneous. The scheduling agent 204 can take into account, if necessary, a lifecycle of the particles. If the particles are likely only viable for a period of six hours after their generation, the scheduling agent 204 can take into account all of the timings involved, including a scheduled time for the communication between the devices, if that is established, and deliver the particles in time for them to be positioned, and viable to a high degree of probability, to enable the secure communication.

In some cases, the satellite 202 could deliver via the free space interface, particles to receiving stations positioned on airplanes, balloons, drones, or any other flying device. These devices could receive the entangled particles, land or be pulled down to earth, and be plugged into a fiber-optic system, at which point the particles could be delivered via the fiber-optic system to the devices used for communication. Also shown in FIG. 2 is the concept of satellite 202 delivering particles to secondary satellite 206 that then could transmit the particles to a receiving station 2284 communication to one or more devices 232, 234, 236 via fiber-optic capabilities 222.

The intelligence in the scheduling agent 204 can also include predictive capabilities. Predictive capabilities can be learned through machine learning or artificial intelligence. For example, given the different time zones between Tokyo and New York, there may be a short window of time in which a lot of secure communications occur while people in both locations are awake and it worked. The intelligence scheduling scheme 204 could instruct the quantum entanglement production system to produce a certain amount of entangled particles and deliver them to receiving stations 208, 214, such that they are closer to and prepared to be delivered to the individual devices involved in communications. In some respects, the production system can include a combination of local production, as well as satellite production. For example, if a device 202 is used to request quantum entangled particles for communication with device 209 or 210, which are within 100 km of each other, then the intelligent agent 204 is simply instruct a particle generator that is localized at system 208 to generate the particles and distribute them through the fiber-optic network 222. In some cases, the production of particles could be a combination of air based 202 production and land-based 208 production. For example, if a video conference is to be set up between device 212 and device 209, which are both in the same local jurisdiction, the local production 208 may not be of the produce enough entangled particles to handle the level of security needed. Satellite 202 could transmit the entire pairs of entangled particles to receiving station 208 which can then supplement its local production.

It is also noted that in some cases a land-based production system could product a pair of entangled particles and transmit one particle to a satellite for distribution to another location and keep the other particle local as one of the nodes to the communication might be local to the production system.

It is noted that the devices 212, 209, 210, and so forth can be any devices within a network or a network fabric. For example, cloud-based devices, fog-based devices, satellite-based systems, virtual devices, switches, network nodes, could each have a quantum entangled particle device 146 which can receive entangled particles for use for secure vacations with any other particle.

For example, a switch within a network could receive high-value high-priority traffic that is designated for another switch across the network. In one aspect, there could be a history of suspected eavesdropping or hacking of the communication. In this scenario, the switch could automatically request secure communication for the data and, in real time or essentially real-time, or in a scheduled fashion, order and receive entangled quantum particles between the switch and a receiving switch such that the data is securely communicated over any particular link within the network.

Other data that can be taken into account is a priority of a user, a cost for producing the particles and delivering the particles, a classification or category of the user or of the data, a timing of the day, a distance needed between the particles, a volume of the requests, a lead time on the request, and so forth. The requester may include a requested block of time or a specific time in which the communication is to take place. For example, scheduling agent 204 could be integrated into a user's calendar such that a scheduled conference call could automatically identify all of the necessary parameters, such as the parties to the call, the capabilities to handle quantum entangled particles at each location for the videoconferencing call, and so forth. The user interface can include of course fields or intractable objects to be of the request. Such a secure communication. The user interface could also include an indicator when one or more stages of the process is complete. For example, the organizer could receive a first indication that all of the parties' devices are confirmed to be operational and capable of utilizing entangled particles. Next, one or more parties could receive a notification that the entangled particles are confirmed as delivered. As the conference call proceeds, the system could maintain a notification of the parties that the highest level of security is being actively implemented for the call. If the system runs out of quantum particles or is no longer secure, a notification could be provided to the parties of such change in the status. In another aspect, throughout a call—additional quantum particles could be generated and delivered to maintain a secure connection.

In one aspect, if the number of quantum particles becomes dangerously low, and it appears that the communication is going to continue, manually through a user or automatically, the system can request additional entangled particles in order to continue with the secure communication. Again, using machine learning and pre-positioning, particles could be generated and positioned close to the communication nodes for more immediate availability in such cases.

In other cases, a communication can be automatically paused or cut off if the system runs out of quantum particles or is waiting for additional particles. In one scenario, the system could turn to an alternate form of communication.

During this time the system could present a notice or alternate programming with an estimated time of delivery of additional particles for continued secure communication.

Taking the example set forth above, assume that Alice wants to send a secret message to Bob that cannot be hacked. Alice could request and receive at her device 212 in New York a first group of one hundred particles. Each of these particles would represent one particle of a pair of entangled particles. Bob receives a second group of one hundred particles on his device 220 in Tokyo. The scheduling service 204 receives the request, and the identification of the device 212 and device 220, confirms a capability, and delivers the one hundred pairs of particles to the appropriate destinations.

In this example, once the groups of particles are distributed, Alice can write the message "Meet me for lunch Sunday at the Ritz in Toyko" and then detect the characteristics of the first group of one hundred particles. Assume, for the sake of argument, that the output is a "1" for an up spin and a "0" for a down spin of a respective particle. A set of bits can result from the first group of particles. The message can then be encrypted with this set of bits. The benefit of quantum entanglement is that once the spin is detected for the first group, immediately the respective spin for each member of the second group of particles is established. Bob can receive the encrypted message and then view the second set of particles and simply identify that each particle should have a "0" for an up spin and a "1" for a down spin. The first particle in the first group will have a "1" for an up spin and the first entangled particle and the second group will have a "1" for a down spin. In this manner, the private key for the encrypting the message is held by Bob the instant that Alice detects the spin of the particles in the first group. Of course this approach could work for a single pair of particles utilizing any quantum characteristics.

The atmosphere at the lowest 10 km on earth causes a degradation of a laser that contains photons as disclosed herein. Accordingly, it is preferable that receiving stations 208 and 214 are at an elevation on the earth of 10 km or higher. However, where this is not possible, other approaches could be used, to transmit the physical particles received from the satellite 202 down to earth. For example, a tethered balloon could include a receiving unit that is raised into space high enough such that a receiving unit associated with a balloon could receive a delivery of particles from a satellite 202. The balloon could then be brought back down to earth and the container that includes the particles could be connected to a fiber-optic distribution center for delivery to a respective device. A drone could also be used which could be sent up into the air at an elevation high enough in order to receive a delivery of particles from the satellite 202, at which point the drone could to send to a docking station where a fiber-optic network could deliver the particles to the ultimate station. In one aspect, the benefit of a drone and in some cases a balloon system could be the ability to position the receiving station in the air in such a position so as to avoid clouds or other obstructions which can enable the laser delivery from the satellite 202 to be effective in delivering the particles to a receiving unit within the drone or balloon. Of course, aircraft, helicopters, rockets, or any other device should be equipped with a receiver for receiving the particles.

As noted above a flying vehicle could also delivery particles to a satellite for transmission to another location as part of the process. The drone could even physically deliver particles to the destination node or a building where the destination node resides for a very short last leg transmission or delivery of the particle.

One aspect of this disclosure is a system in which aircraft are configured with a quantum entanglement particle receiving unit positioned, for example, on its roof or top surface. Inasmuch as aircraft will often fly at elevations of 30,000 feet or above, in situations where timing is not urgent, aircraft could be equipped to receive particles which are destined for a particular location. For example, if a user Alice in New York desires to send an encrypted message on a Tuesday to Bob in Tokyo, Alice can request via the system disclosed herein the entangled particles for his device and Bob's device. The system 204 can tap into the database of receiving devices 208, 214 and determine that a particular plane that is equipped with a receiving device is landing in New York on Monday night. The satellite 202 can generate the batch of entangled particles and transmit the first group to the New York bound plane quantum entanglement particle receiving device while the plane is en route and positioned properly relative to the satellite. The New York bound plane can land and have a technician plug-in a fiber-optic connector to the receiving device which can cause the first group of entangled particles to be delivered from the planes receiving device through the fiber-optic system to Alice's device 210. Similarly, another Tokyo bound plane could receive a second group of entangled particles from the satellite 202 and when that plane lands in Tokyo, a fiber-optic connection can be established with the plane and the second group of entangled particles can be delivered to Bob's device 216. It is noted that the satellite 202 can have a buffer system which can store entangled particles. Thus, the first group of entangled particles and the second group of entangled particles do not need to be delivered simultaneously. The satellite 202 could, for example, deliver the first group of entangled particles to first receiving station 208 as the satellite is in the proper position with respect to that station. The second group of particles could be delivered to a plane, drone, or balloon system at a later time when the various devices are properly positioned relative one to another.

The user devices 212, 220 upon receiving in their respective quantum entanglement particle management systems, can provide a signal to the sender and recipient that the entangled particles are received and ready to be used for a secure communication. The system 204 can include various aspects for express delivery, increased charges, estimated delivery time, data on the delivery path and mechanism, and any other data associated with the timing, cost, quantity, quality, and so forth associated with the delivery of quantum entangled particles for use in a data communication.

It is noted that it is difficult to store and release and entangled particle. However, devices have been developed that can consist, in one example, a load of neodymium atoms buried in a crystal of ytterbium silicate which, when cooled, can absorb and store photons. Such devices cannot only store photons but can be used to store the crystal entangled particles. This disclosure does not focus on any particular device for storing and or communicating entangled particles. Any known or future developed storage device can be implemented in the quantum entanglement particle distribution system disclosed herein.

The scheduling agent 204 can communicate with other scheduling agents 230 in different locations. In this manner, a mesh network of sorts can be developed throughout the world such that individual users can submit requests for secure communications between any two capable devices. For example, scheduling agent 204, given the weather conditions associated with satellite 202, could provide the instruction to another instance of a scheduling agent 230 to communicate with a different satellite 226 for the production and delivery of quantum particles. The satellite 226 could identify an alternate path given the schedule needed for the production and delivery of the particles. For example, if a large storm system prevent satellite 202 from delivering particles at a requested time to the two nodes utilizing the particles, one of which is in New York, the system could shift the instruction to a secondary satellite 226, and the system can evaluate air plane travel, availability and distances associated with land-based fiber-optic systems, and reroute the particle delivery channel. For example, satellite 226 could produce the entangled particle pairs, and deliver one part of the pairs to an airplane which it has access to within the proper timeframe in which is going to land in New York. When the airplane lands, a fiber-optic network could be linked to the receiving unit 228 on the airplane such that the particles could be delivered to the device 232.

In this aspect, the scheduling agent 204 or any other components, will determine routes for delivering entangled particles to the proper destinations. A latticework could be developed for each proposed distribution and delivery such that it finds a best route through latticework via a Viterbi research or some other means. Where additional data may be obtained, such as weather patterns, which can prevent a preferred route from being possible, the system could or reevaluate the approach to identify alternate routes for delivering the particles. Different rounds of evaluation codes exist as well. For example, a first evaluation, which could be the cheapest, would not take into account airplane based receiving devices that only direct delivery from satellites to ground stations. If a preferable route is not possible, then the search. Parameters could expand to include the airplane delivery mechanism which would take into account airplane schedules, routes, and so forth. In some scenario, dedicated planes could be utilized for flying particular routes, gathering particles, and delivering them to certain jurisdictions.

Another aspect of this disclosure includes mechanisms for enabling multiple communications between different people. Assume that Alice is in New York, Bob is in Tokyo, and Ted is in LA. Assume that each of these individuals email each other multiple times a day or have other types of communications such as telephone calls. Given the patterns of communication and any other such data such as calendar data, email data, social media data, telephone conversations, birthdays, and so forth, a scheduling agent 204 can position the proper entangled particles sets at the proper devices to enable secure communications.

In this example, assume that Alice has a device 212 that stores in its entangled particles storage 146 her portion of a set of entangled pairs in which the other portion is in Bob's computer 220 in Tokyo. Alice also stores her portion of the second set of entangled pairs in which the other portion is in Ted's computer 232 in LA. In this scenario, when Alice begins an email message to Bob, the system detects that the communication is between Alice and Bob and that the story entangled particles should be applied to that communication. The system can automatically utilize the proper pairs of entangled particles for that communication.

Then, if Alice picks up the phone or begins another email to communicate with Ted in LA, the system can detect and coordinate the fact that there are pairs of entangled particles established properly in the devices to enable that secure communication to occur. The system could in real time confirm that sufficient viable particles exist at each end of the tweet occasion and provide an indicator to one or both users that the communication is confirmed to be secure, via entangled particles.

For example, as Alice begins the email to Bob, the system could send a message to Bob's computer to confirm that ten thousand viable entangled particles exist and could receive a confirming message. Perhaps the level of security might change. Given the number of viable particles that are available and such variation could be presented to the users. For example, a low level of security might only be available if there are ten viable pairs between the two devices. Standard encryption may be the only security available in some scenarios. Part of the disclosure herein is presenting and making known via viewable objects, audible approaches, or any other mechanism that instructs the user's regarding the level of security and viability of the quantum entanglement available.

Blockchain technology has recently burst upon the scene as being a viable technology for recording data, such as bitcoin transactions. The Blockchain has been applicable in many scenarios and could certainly be applicable to the entangled particle distribution system disclosed herein. For example, any data which is disclosed herein could be stored and made publicly available via a Blockchain. For example, the use of and production of entangled particles could be stored and made available via the Blockchain. Any aspect of scheduling, distribution, use, historical data, predictive data, and so forth could be implemented in the context of Blockchain technology.

Figure 3:
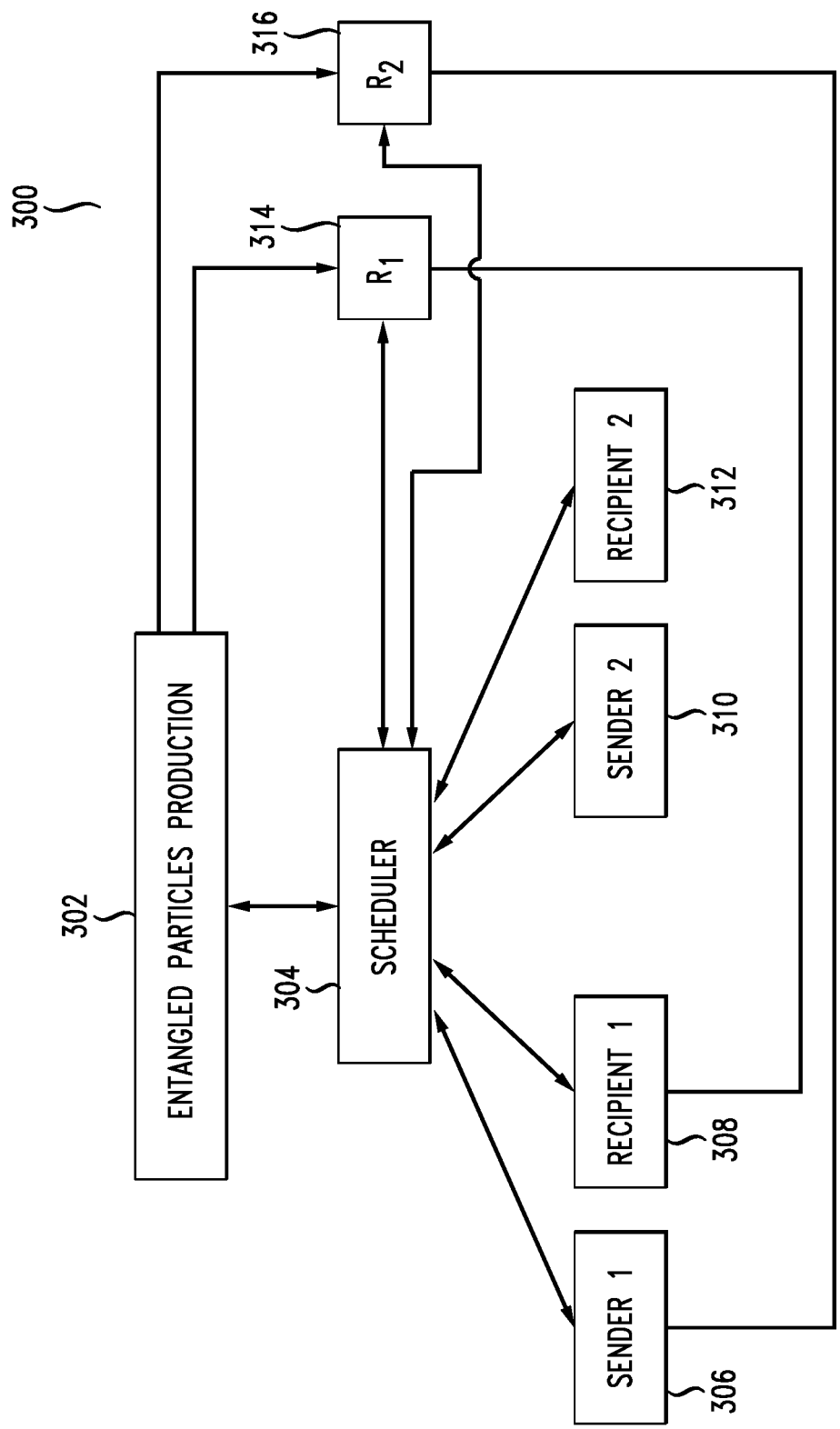
FIG. 3 illustrates a scheduler.

FIG. 3 illustrates a general scheduling system 300 according to one aspect of this disclosure. An integral particle production system 302 can include any number of production components including land-based components, airbase components, space-based components, moving component such as on airplanes, and so forth. The production system can include combinations of free space distribution as well as fiber-optic distribution depending on the distance is needed between any sender 306 and recipient 308. The scheduler 304, as noted above, will receive information from a variety of sources. The scheduler 304 can receive information about the capabilities, the weather conditions, air plane traffic control patterns and schedules, other device capabilities, satellites or a network of satellites in their positions and capabilities, and so forth. The scheduler 304 can receive data from earthbound receiving stations 314, 316. The data can include current capabilities, currently stored entangled pairs, schedules of delivery of entangled pairs, and so forth. The scheduler can also receive data from senders 306, 310 as well as recipients 308, 312. These communications can represent the requesters within the system for quantum entangled pairs. The request can be received manually from human users or automatically from any device, node or network component that may have a need for secure communications. The request could include such information as an identification of the two different nodes involved in the communication such that the scheduler 304 can coordinate the production of the entangled pairs and the proper delivery through the network. 300 of each particle in a respective entangled pair to the proper locations. The request could include a window of time at which the communication desires to occur which can include a preferred period of time, a required period of time, and flexibility parameters for variations thereof. For example, the request may include a preferred period of time of between 3 PM and 4 PM ET for a teleconference. However, the request may include a flexibility parameter which indicates that between 2 PM and 5 PM would also be acceptable.

The scheduler can take all of this information to account, including a user susceptibility to increasing costs to meet required or preferred time frames or other parameters, in making scheduling decisions. For example, the timeframe above may cost the user, an extra $50 to receive the entangled particles for use between 3 PM and 4 PM. Receiving the particles at 4 PM for use between 4 PM and 5 PM may not cost the user any additional money.

Also disclosed herein would be any user interface, which presents the various types of data disclosed herein and can receive any one or more of user input via touch, graffiti, voice, text, or any other type of communication such that changes in expected delivery times, and quality, notifications of position particles ready for use, and so forth can be communicated between the system and a user. All such interfaces and communications are considered within the scope of this disclosure.

Figure 4:
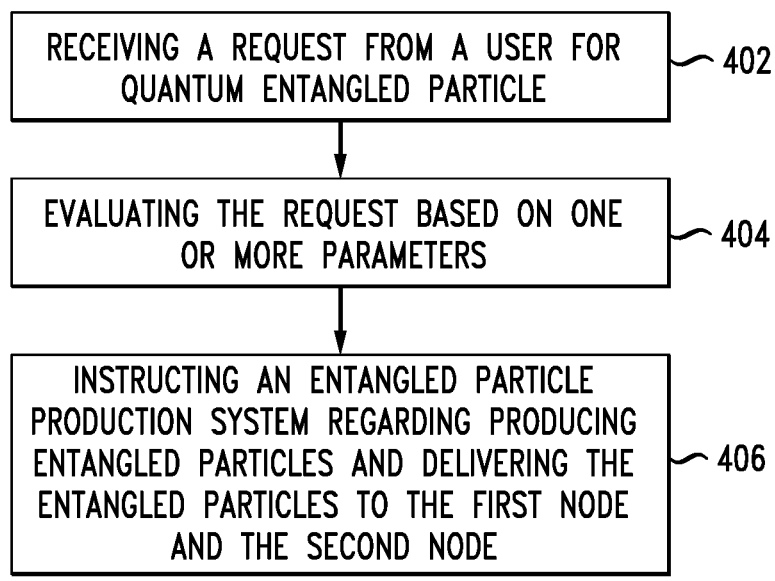
FIG. 4 illustrates a method embodiment.

A method aspect is disclosed in FIG. 4. A method includes receiving a request from a user for quantum entangled particles (402). The request can include the various components disclosed herein, including an identification of a first node and a second node, each of which will receive a particle that is part of entangled pair. A scheduler evaluates the request based on one or more parameters (404). The scheduler communicates with an entangled particle production system, with instructions regarding producing entangled particles and delivery of the entangled particles to the first node and the second node (406). The particles may already have been produced and just need to be delivered. The scheduler can include an identification of a pathway work communication channel for the article pairs. An evaluation of the viability, probabilities, and capabilities of all of the components along the route, including the ultimate destination nodes could be included. If the entire channel is viable and open, and the receiving nodes have the proper capabilities, the scheduler could commit the production and/or delivery of entangled particles along the chosen routes to the respective devices. Again, given all this information, the scheduling system 204 can utilize any type of data for scheduling the production and/or delivery at certain times given one or more of the various parameters disclosed herein. The system can load balance between satellites or production systems as well given the intelligence built into the system.

In another aspect, the method can include receiving, at a scheduling server, a request for a first particle of a pair of quantum entangled particles and a second particle of the pair of quantum entangled particles, evaluating the request based on one or more parameters to yield a schedule and communicating instructions from the scheduling server to an entangled particle production system to generate and/or deliver, according to the schedule, the first particle to a first node and to generate and/or deliver the second particle to a second node according to the request. The request can include an identification of the first node and the second node. The instructions can include one of a schedule and a route for delivering the first particle to the first node and for delivering the second particle to the second node. The route can begin with a satellite production system (or any other system) which transmits the quantum particles through laser to ground receiving stations for delivery via fiber-optic cables to the first node and the second node.

The quantum entangled particles can be any entangled particles such as photons, electrons, atoms, molecules or any other particles that can be generated as an entangled pair and delivered to destination nodes. Indeed, the production system might select what type of particles to generate based on how far the nodes are apart, the type of path needed to distribute the nodes, the type of communication or other factors.

The entangled particle production system can include a satellite, a device on an airplane, and/or a ground-based production system. The entangled particle production system can deliver the pair of quantum entangled particles via a laser to at least one ground station. The entangled particle production system can deliver the first particle to a first ground station and can deliver the second particle to a second ground station. Typically, the first ground station then delivers the first particle to the first node and the second ground station also delivers the second particle to the second node. This process of course can be asynchronous and any individual node or device in the distribution system can store a quantum particle of a pair of quantum particles and preparation for delivering to a node.

The schedule can include a requirement to generate and/or deliver the first particle to the first node and to generate and/or deliver the second particle to the second node prior to an established time for a communication between the first node and the second node. The schedule can be established based on one or more of a priority associated with the first node or the second node, a priority associated with users of the pair of quantum entangled particles, a priority associated with a communication to be established using the pair of quantum entangled particles, a type of quantum particle, a characteristic of the first node and the second node, a first delivery route between the entangled particle production system and the first node and a second delivery route between the entangled particle production system and the second node, a cost, weather conditions, a load on the entangled particle production system, load-balancing associated with an entangled particle delivery system, a volume of requests for quantum entangled particles, a load on the entangled particle production system associated with delivering produced quantum entangled particles, a type of communication associated with the request, a preferred schedule versus an acceptable schedule for delivering the quantum entangled particles, a time of day of the request, a timing associated with a required delivery of the quantum entangled particles, whether asynchronous delivery of the quantum entangled particles is required, and airplane schedule associated with planes having quantum entangled receiving devices, a viability time associated with the quantum entangled particles, and a distance between the first node and the second node.

The schedule can include an identification of a first path through a quantum particle delivery system for the first particle to travel to the first node or a second path through the quantum particle delivery system for the second particle to travel to the second node. Once the respective particles are delivered to the respective nodes, they can be used for communicating data, if possible, or can be used to encrypt or secure a communication between two parties such that the communication cannot be hacked.

Other factors that can be included in establishing a route and schedule for delivery of quantum entangled particles can include costs of different approaches, such as storing particles on a satellite versus storing particles on a ground station or plane station. Different sources may produce different quality of particles where some may be more reliable or may utilize a different protocol than others. The system could evaluate source quality and/or type of particles with sender and receiver equipment and the respective capabilities of the equipment such that the scheduler makes decisions regarding one or more of source location, timing of delivery, type of quantum particle generated or used for the communication, routing choices, and so forth.

The system predisposed herein provides a clear improvement to the prior technology which does not take into account the various parameters needed to schedule the delivery of entangled particles for secure communications.

In some embodiments the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

In one aspect when a quantum link is technically quantum between any two nodes, it still may not be 100 percent secure. Photons, or light, can only go through about 100 kilometers of optic fiber before getting too dim to reliably carry data. As a result, the signal needs to be relayed by a node, which decrypts and re-encrypts the data before passing it on. In one instance, a satellite, plane or other entity such as a drone can deliver quantum particles where there might be too many nodes between devices with the need for decryption and encryption. For example, rather than requiring 32 nodes of decryption between two devices, the system could deliver the quantum particles to a particular location in which there is only 10 nodes which are potentially hackable. For a quantum communication system to be 100 percent secure, the nodes themselves would have to be hack-proof as well. This can be where a quantum repeater can also be incorporated into the network.

A quantum repeater essentially serves the same purpose as an ordinary relay node, except it works in a slightly different way. A network using quantum repeaters is shaped more like a family tree than a linear chain. In the family tree-shaped configuration of telephone or other communications, the quantum repeater is the parent who distributes identical pairs of quantum keys between two children, therefore doubling the possible distance between users. Moreover, these "parents" can also have their own "parents," which can then double the key-sharing distance between the children at the bottom for every extra level created atop the family tree. This approach can increase the distance a quantum message can be sent without decryption.

Stated another way, a quantum repeater in one aspect includes two sources of entangled particles. The first source produces a first particle entangled with the second particle. The second source produces a third particle entangled with the fourth particle. The distance that the first source can spread the first particle away from the second particle is limited. This is similar for the third particle and the fourth particle. A quantum measurement device can be positioned however to receive the second particle and the third particle and perform a quantum measurement. The device can determine whether the two particles are identical or have a certain type of correlation. If the measurement succeeds, then the determination is that the other two particles, the first particle and the fourth particle, are entangled together. The state representing disentanglement depends upon the results of the quantum measurement of the second particle and the third particle. By using the quantum measurement, the system can establish the entanglement of two particles which are separated by a distance larger than the one capable of being reached using the single source of entangled particles. In this respect, a quantum repeater can increase the distance over which entangled particles can be distributed. Larger distances can be established by concatenating multiple quantum repeaters using a similar process. In other words, the system could include four sources of quantum entangled particles and three quantum measurement devices which could result in a first entangled particle being correlated with a second entangled particle a greater distances. The process is available as well.

Entanglement is an important element that allows quantum cryptography to stop hacking attempts. Any measurement of a quantum signal will degrade the quantum correlations between entangled states, setting off alarms of a security breach. However, the fragility of entangled states makes it difficult to distribute entanglement over distances of thousands of kilometers using current fiber networks. Researchers proposed breaking the problem up into shorter segments. The so-called DLCZ protocol (named after the authors Lu-Ming Duan, Mikhail Lukin, Ignacio Cirac and Peter Zoller) involves the creation of entanglement between quantum repeaters situated every hundred kilometers or so along an optical fiber link. These repeaters are first excited by a strong laser pulse. By interfering single photons emitted by two nearby repeaters, it's possible to entangle their excited states. This type of interference is not always successful and can require several tries. For this reason, repeaters must be able to store the quantum information from the initial pulse for an extended period of time.

Applying this principle to the concepts disclosed herein, consider a first party in Los Angeles who desires to send a secret message to a second party in New York. The method would operate as follows. The system will identify the location of the first node or the computer of the first party and the second node or the computer of the recipient of the message. Of course the message could be any message such as a telephone call, an email, a text, a video conference, accessing a database, surfing for a website, and so forth. Once the physical location of the two endpoints of the communication is established, the system can then determine the necessary distance between respective entangled particles of a pair of entangled particles and instruct 1, 2, 4, 8 or any necessary number of sources (it does not have to be a multiple of 2) of quantum entangled particles to generate the respective pair of quantum entangled particles and transmit the proper particles to quantum measuring devices such that ultimately of all of the produced entangled particles, a first entangled particle is transmitted to a source device and a second entangled particle is transmitted to the recipient device in an entangled states. It is recognized that of all of the quantum entangled particles produced by one or more quantum entanglement particle sources, one of the particles is communicated to the source device and another one of the particles is transmitted to the recipient device. Other particles are transmitted to quantum measuring devices for an evaluation of correlation and to follows the pattern set forth above to enable the larger distance to be established. After the proper delivery of the first quantum entangled particle correlated with the second quantum entangled particle, the message can be delivered or the communication or data can be delivered utilizing the encryption capable because of the existence of the quantum entangled particles. The approach disclosed herein involves the identification of the particular quantum particle source devices and the creation of the proper pathway or configuration of quantum particle source devices, and quantum measuring devices, including the use of quantum memory devices, throughout a network which can enable the separation of correlated quantum entanglement particles between the two devices that desire encrypted communication. The network would be established with various distributed quantum particle source devices and quantum measurement devices within the proper distances of each other to enabling the concatenation of quantum repeater devices across the necessary distance. Once a mesh of these various devices is created over a geography, individuals could have at their local device a quantum memory unit in connection with the computing devices and the system could simply identify the nodes on each side of the communication as the user initiates a communication and instantly request the quantum entangled particles to help manage the encryption or security that communication in this manner. This provides an improved approach to quantum key distribution.

In another aspect, once a source node and the destination notice identified, alternate approaches to establishing entanglement can be used. For example, one can proceed between the source node and the destination node by creating entanglement independently between shorter elementary links such as between the source node and a first node, and the between a second node and a third node, and between a fourth node and a fifth node, a sixth node and the destination node. Entanglement is then swapped between neighboring links such that the locations between the source node and the fourth nodes is established and a entanglement between the destination node in the fifth node is established. Entanglement swapping can then occur between the fourth node in the fifth node and each short elementary link is thus removed until the last entanglement swapping enables a first entangled particle at the source node being entangled with the second entanglement particle at the destination node.

In this regard, the system, after identifying the nodes at either end of the communication, would then establish the intervening nodes that would be necessary in order to utilize entanglement swapping in order to create the necessary entanglements between the intermediate nodes, perform the entanglement swapping between the respective intermediate nodes and ultimately establish the entanglement between the source node and the destination node. The system would utilize the scheduling concepts disclosed herein in order to schedule each necessary node and then create the entangled particles for distribution and ultimately enable the entanglement swapping operations to be performed which successively operate in a hierarchical fashion until and the entanglement is distributed over the entire desired distance separating the locations. The paper "Quantum repeaters based on atomic assemblies and linear optics" by Sangouard et al, Review of Modern Physics, Volume 83, January-March 2011, which describes this basic approach, is incorporated herein by reference.

There are a number of different technical approaches to Quantum repeaters. Generally speaking, however, given the limited distance that original particles in a pair of quantum entangled particles can travel apart from each other, each approach requires establishing shorter segments between larger distances of the source device and the destination device. The present disclosure focuses on the concepts of how individuals or devices would identify a source node and the destination node, identify, reserve or schedule quantum entangled particles from source devices, and utilize the necessary intermediate nodes, quantum storage devices, and so forth to enable a pathway or an infrastructure for generating a segment by segments quantum entanglement and then performing the necessary measurements or swapping activity, or any other necessary steps to ultimately establish entanglement between a first entangled particle that is distant from a second entangled particle. Once the system determines that the ultimate distributed entangled particles are properly received and stored at the source device and the destination device, then the secure communication can occur utilizing the quantum entangled particles.

This disclosure includes a control system that will identify the various components within a network which need to be coordinated in order to establish the proper positioning of a pair of entangled particles. For example, once the source node and the destination node are identified, the system may need to provide an instruction to quantum entangled particle source number 32 to create a first quantum entangled particle paired with the second quantum entangled particle. The first quantum entangled particle is transmitted to the source node quantum memory device. The second quantum entangled particle is transmitted to quantum measurement device number 12. Instructions are also provided to quantum entangled particle source to send a third quantum entangled particle to the quantum measurement device and a fourth quantum entangled particle to be sent to the destination node. Instructions need to be delivered to various source devices and intermediate destination devices, measuring devices, quantum memories, and so forth in a particular pattern in order to establish the proper pairing of quantum entangled particles between the source node and the destination node. The present disclosure focuses on how the system would therefore instruct and cause the processor to be initiated as triggered by a request for communication between two particular devices.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other. It is also noted that claims can be drafted from any standpoint or any node or component within the overall distribution system. For example, claims could be drafted from the standpoint of a satellite that receives scheduling instructions and production instructions from a scheduling server in that the satellite acts upon those instructions to produce quantum entangled particles and transmit the quantum entangled particles into the distribution system for delivery to communication nodes. Claims could be drafted from the standpoint of the scheduling server which receives requests and communicates instructions to a quantum entangled particle production system, such as a satellite or other unit. Claims could also be drafted from the standpoint of user devices that receive the quantum entangled particles in which then utilizes particles for secure communications. User devices could therefore transmit a request for particles according to one or more parameters, and then, based on the timing, schedule, workload, load-balancing, cost, or any other parameters, receive quantum entangled particles from the production system. Embodiments could also be drafted from the standpoint of distribution nodes or receive, store, and forwarding facilities. For example, where an airplane is used to receive quantum entangled particles from a satellite, store the quantum entangled particles until landing, and then delivering the quantum entangled particles to a distribution system, claims could be drafted from the standpoint of the airplane having the appropriate equipment to perform the functions disclosed herein.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   receiving, at a scheduling server, a request for a first particle of a pair of quantum entangled particles and a second particle of the pair of quantum entangled particles;
   evaluating the request based on one or more parameters to yield a schedule;
   communicating instructions from the scheduling server to an entangled particle production system; and
   delivering, from the entangled particle production system and according to the schedule, the first particle to a first node at a first time and to deliver the second particle to a second node according to the request at a second time that is later than the first time, wherein the second time depends on a movement of the entangled particle production system.

2. The method of claim 1, wherein the request comprises an identification of the first node and the second node.

3. The method of claim 1, wherein the instructions further comprise one of a schedule and a route for delivering the first particle to the first node and for delivering the second particle to the second node.

4. The method of claim 1, wherein the entangled particle production system comprises a satellite or a ground-based system.

5. The method of claim 4, wherein the entangled particle production system delivers the pair of quantum entangled particles, via a laser to at least one ground station.

6. The method of claim 5, wherein the entangled particle production system delivers the first particle to a first ground station and delivers the second particle to a second ground station.

7. The method of claim 6, wherein the first ground station delivers the first particle to the first node and the second ground station delivers the second particle to the second node.

8. The method of claim 3, wherein the schedule comprises a requirement to deliver the first particle to the first node and to deliver the second particle to the second node prior to an established time for a communication between the first node and the second node.

9. The method of claim 3, wherein the schedule is established based on one or more of a priority associated with the first node or the second node, a priority associated with users of the pair of quantum entangled particles, a priority associated with a communication to be established using the pair of quantum entangled particles, a type of quantum particle, a characteristic of the first node and the second node, a first delivery route between the entangled particle production system and the first node and a second delivery route between the entangled particle production system and the second node, a cost, weather conditions, a load on the entangled particle production system, load-balancing associated with an entangled particle delivery system, a volume of requests for quantum entangled particles, a load on the entangled particle production system associated with delivering produced quantum entangled particles, a type of communication associated with the request, a preferred schedule versus an acceptable schedule for delivering the quantum entangled particles, a time of day of the request, a timing associated with a required delivery of the quantum entangled particles, whether asynchronous delivery of the quantum entangled particles is required, and airplane schedule associated with planes having quantum entangled receiving devices, a viability time associated with the quantum entangled particles, and a distance between the first node and the second node.

10. The method of claim 1, wherein the schedule comprises an identification of a first path through a quantum particle delivery system for the first particle to travel to the first node or a second path through the quantum particle delivery system for the second particle to travel to the second node.

11. A quantum entangled particle production and delivery system comprising:
a scheduling server;
at least one processor; and
a computer-readable storage device storing instructions which, when executed by the at least one processor, cause the at least one processor to perform operations comprising:
receiving, at the scheduling server, a request for a first particle of a pair of quantum entangled particles and a second particle of the pair of quantum entangled particles;
evaluating the request based on one or more parameters to yield a schedule; and
delivering, according to the schedule, the first particle to a first node at a first time and to deliver the second particle to a second node according to the request at a second time which is later than the first time, wherein the second time is based on a movement of the quantum entangled particle production and delivery system.

12. The quantum entangled particle production and delivery system of claim 11, wherein the request comprises an identification of the first node and the second node.

13. The quantum entangled particle production and delivery system of claim 11, wherein the instructions further comprise one of a schedule and a route for delivering the first particle to the first node and for delivering the second particle to the second node.

14. The quantum entangled particle production and delivery system of claim 11, wherein the quantum entangled particle production and delivery system comprises a satellite.

15. The quantum entangled particle production and delivery system of claim 14, wherein the quantum entangled particle production and delivery system delivers the pair of quantum entangled particles, via a laser to at least one ground station.

16. The quantum entangled particle production and delivery system of claim 15, wherein the quantum entangled particle production and delivery system delivers the first particle to a first ground station and delivers the second particle to a second ground station.

17. The quantum entangled particle production and delivery system of claim 16, wherein the first ground station delivers the first particle to the first node and the second ground station delivers the second particle to the second node.

18. The quantum entangled particle production and delivery system of claim 13, wherein the schedule comprises a requirement to deliver the first particle to the first node and to deliver the second particle to the second node prior to an established time for a communication between the first node and the second node.

19. The quantum entangled particle production and delivery system of claim 13, wherein the schedule is established based on one or more of a priority associated with the first node or the second node, a priority associated with users of the pair of quantum entangled particles, a priority associated with a communication to be established using the pair of quantum entangled particles, a type of quantum particle, a characteristic of the first node and the second node, a first delivery route between the quantum entangled particle production and delivery system and the first node and a second delivery route between the quantum entangled particle production and delivery system and the second node, a cost, weather conditions, a load on the entangled particle production system, load-balancing associated with an entangled particle delivery system, a volume of requests for quantum entangled particles, a load on the entangled particle production system associated with delivering produced quantum entangled particles, a type of communication associated with the request, a preferred schedule versus an acceptable schedule for delivering the quantum entangled particles, a time of day of the request, a timing associated with a required delivery of the quantum entangled particles, whether asynchronous delivery of the quantum entangled particles is required, and airplane schedule associated with planes having quantum entangled receiving devices, a viability time associated with the quantum entangled particles, and a distance between the first node and the second node.

20. The quantum entangled particle production and delivery system of claim 11, wherein the schedule comprises an identification of a first path through a quantum particle delivery system for the first particle to travel to the first node or a second path through the quantum particle delivery system for the second particle to travel to the second node.

* * * * *